(12) United States Patent
Huang (10) Patent No.: US 8,733,944 B2
(45) Date of Patent: May 27, 2014

(54) ILLUMINATION SYSTEM AND PROJECTION APPARATUS COMPRISING THE SAME

(75) Inventor: June-Jei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 337 days.

(21) Appl. No.: 13/216,300

(22) Filed: Aug. 24, 2011

(65) Prior Publication Data

US 2012/0162612 A1 Jun. 28, 2012

(30) Foreign Application Priority Data

Dec. 27, 2010 (TW) ................................ 99145984 A (51) Int. Cl.
*G03B 21/14* (2006.01)
*G03B 21/00* (2006.01)
*H04N 9/12* (2006.01)
*H01J 1/62* (2006.01)
*H01J 63/04* (2006.01)

(52) U.S. Cl.
USPC ............... 353/84; 353/31; 348/743; 313/501

(58) Field of Classification Search
USPC .......... 353/84, 94, 30, 31, 122; 313/483, 501; 362/84, 231; 359/885–892; 250/484.2, 250/484.4, 493.1–504 H; 348/743
See application file for complete search history.

(56) References Cited

U.S. PATENT DOCUMENTS

| | | | |
|---|---|---|---|
| 8,496,332 B2 | 7/2013 | Wang | |
| 2008/0037136 A1 | 2/2008 | Tsutsumi | |
| 2009/0034284 A1* | 2/2009 | Li et al. ........................ | 362/554 |
| 2010/0328633 A1* | 12/2010 | Sato et al. ...................... | 353/99 |
| 2011/0249240 A1 | 10/2011 | Takahashi | |
| 2012/0075590 A1* | 3/2012 | Huang ........................... | 353/31 |

FOREIGN PATENT DOCUMENTS

| | | |
|---|---|---|
| CN | 101122674 A | 2/2008 |
| CN | 101539270 A | 9/2009 |
| CN | 101836160 A | 9/2010 |
| TW | 201037360 A1 | 10/2010 |
| TW | 201040651 A1 | 11/2010 |

OTHER PUBLICATIONS

English Translation of Office Action for Chinese Patent Application No. 201110026482.4, dated Aug. 30, 2013.
English Translation of Office Action of Taiwanese Patent Application No. 1022081318001, daed Jun. 26, 2013.
Office Action of Taiwanese Patent Application No. 1022081318001, daed Jun. 26, 2013.
Office Action for Chinese Patent Application No. 201110026482.4, dated Aug. 30, 2013.

\* cited by examiner

*Primary Examiner* — William C Dowling
*Assistant Examiner* — Ryan Howard
(74) *Attorney, Agent, or Firm* — Cantor Colburn LLP (57) ABSTRACT

An illumination system and a projection apparatus are provided. The projection apparatus comprises the illumination system and an imaging system for forming an image. The illumination system comprises a plurality of light source modules, a first wavelength transformer, an optical apparatus and a first angle selective film. The light source modules are used for generating a plurality of light beams. The first wavelength transformer is disposed at a predetermined position. The optical apparatus is disposed between the light source modules and the first wavelength transformer for focusing the light beams to the predetermined position. The first angle selective film is disposed on the first wavelength transformer. The first wavelength transformer is disposed between the first angle selective film and the optical apparatus. The first angle selective film is used for angle-selectively filtering the light beams passing through the first wavelength transformer.

24 Claims, 5 Drawing Sheets

ILLUMINATION SYSTEM AND PROJECTION APPARATUS COMPRISING THE SAME

This application claims priority to Taiwan Patent Application No. 099145984 filed on Dec. 27, 2010.

CROSS-REFERENCES TO RELATED APPLICATIONS

Not applicable.

BACKGROUND OF THE INVENTION

1. Field of the Invention

The present invention relates to an illumination system, and more particularly, to an illumination system for a projection apparatus.

2. Descriptions of the Related Art

Because common light emitting diodes (LEDs) feature high energy conversion efficiency, long service lives, high stability and capability of being instantaneously switched on/off, they have gradually replaced conventional ultra high pressure (UHP) mercury bulbs as light sources of projection apparatuses. When LEDs are adopted as the light source of a projection apparatus, the design and arrangement of internal optical components thereof need to be considered to achieve a desirable light utilization ratio and desirable light distribution uniformity. A common approach is to directly use red LEDs, blue LEDs and green LEDs as the light source of the projection apparatus. However, it is known that the green LEDs have low light emission efficiency and the red LEDs have a high requirement on heat dissipation. Consequently, if the red LEDs, the blue LEDs and the green LEDs are directly used as the light source of the projection apparatus without being appropriately adjusted beforehand, it will be difficult to adjust the overall color uniformity, which makes use of the projection apparatus very inconvenient.

In this case, the light source of the projection apparatus may be provided in another way, i.e., by using a blue LED or an ultraviolet (UV) LED in combination with a color wheel. However, if only the light emitted by a single blue LED or a single UV LED to the color wheel is used as the light source of the projection apparatus, then the luminance of an image projected will be significantly reduced. Moreover, LEDs are a kind of light source with a large divergence angle and a large etendue; as a result, the light source of the projection apparatus will suffer from an inadequate intensity and the light energy emitted from the LED will not be used efficiently if the etendue cannot be reduced for more efficient light concentration.

Accordingly, an urgent need exists in the art to solve the aforesaid problem by increasing the utilization ratio of the light source of the projection apparatus and enhancing the intensity of the whole light source.

SUMMARY OF THE INVENTION

To solve the aforesaid problem, an objective of the present invention is to provide an illumination system for a projection apparatus, which can increase the luminance of the whole light source and effectively concentrate the divergent light rays.

To achieve the aforesaid objective, the present invention provides an illumination system. The illumination system comprises a plurality of light source modules, a first wavelength transformer, an optical apparatus and a first angle selective film. The light source modules are configured to generate a plurality of light beams. The first wavelength transformer is disposed in a predetermined position. The optical apparatus is disposed between the light source modules and the first wavelength transformer, and is configured to focus the light beams to the predetermined position. The first angle selective film is disposed on the first wavelength transformer. The first wavelength transformer is disposed between the first angle selective film and the optical apparatus, while the first angle selective film is configured to angle-selectively filter the light beams passing through the first wavelength transformer.

Another objective of the present invention is to provide a projection apparatus. The projection apparatus comprises the aforesaid illumination system and an imaging system. The imaging system is configured to receive and process a light outputted by the illumination system to form an image.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The description of the following embodiments is only for the purpose of illustration rather than to limit the present invention. It shall be appreciated that in the following embodiments and the attached drawings, elements unrelated to the present invention are omitted from depiction; and dimensional relationships among individual elements in the attached drawings are illustrated only for ease of understanding but not to limit the actual scale.

Figure 1A:
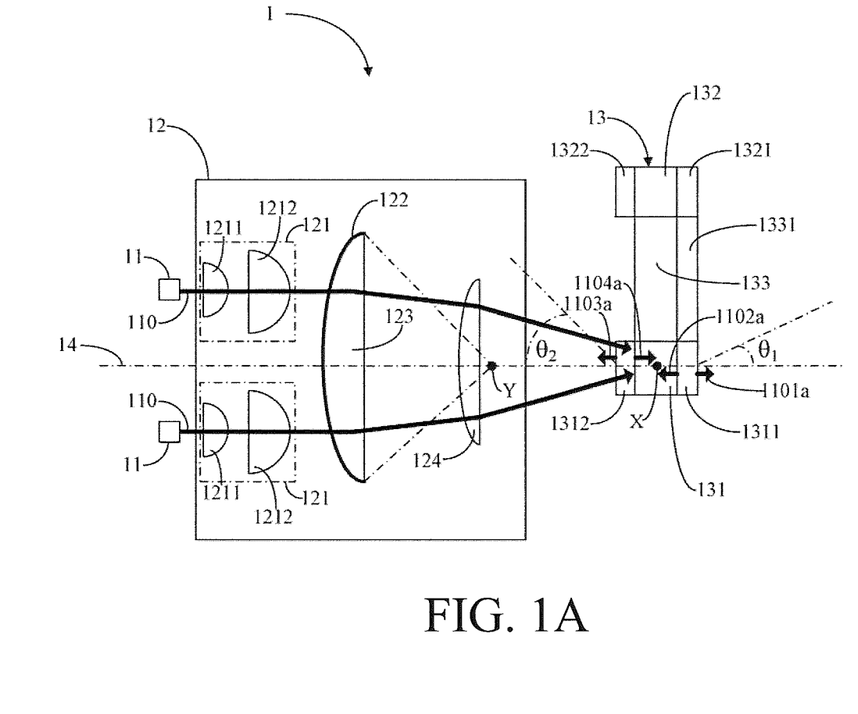
FIGS. 1A-1C are schematic views of a first embodiment of the present invention.

First, FIG. 1A illustrates a schematic view of an illumination system 1 according to the first embodiment of the present invention. The illumination system 1 may comprise a plurality of light source modules 11, an optical apparatus 12, a wheel 13, a first wavelength transformer 131 formed with a first angle selective film 1311 and a second angle selective film 1312, a second wavelength transformer 132 formed with a third angle selective film 1321 and a fourth angle selective film 1322, and a transparent part 133 formed with a fifth angle selective film 1331. The optical apparatus 12 further comprises a plurality of sub-optical apparatuses 121, a dichroic film 122, a third lens 123 and a fourth lens 124. Each of the sub-optical apparatuses 121 further comprises a first lens 1211 and a second lens 1212. In consideration of the cost and the usability, the second lenses 1212 and the fourth lens 124 may be aspheric lenses made of plastic, and the first lens 1211 and the third lens 123 may be made of glass, although the aforesaid materials and shapes of the lenses are not intended to limit the present invention.

Additionally, it shall be particularly appreciated that the first embodiment will be described hereinbelow with reference to two light source modules 11 using blue light emitting diodes (LEDs) and two sub-optical apparatuses 121 as an example, although it is not intended to limit the types and the numbers of the light source modules of the present invention.

Meanwhile, to elucidate the main technical features and efficacies of the present invention more concisely and clearly, the positional relationships among individual components will be defined firstly and then interactions and connections among the components will be explained.

Specifically, the first wavelength transformer 131, the second wavelength transformer 132 and the transparent part 133 are sequentially and circumferentially disposed on the wheel 13, and the optical apparatus 12 is disposed between the light source modules 11 and the wheel 13. In other words, the optical apparatus 12 is disposed between the light source modules 11 and the first wavelength transformer 131, the second wavelength transformer 132 and the transparent part 133. The first wavelength transformer 131 is disposed between the first angle selective film 1311 and the optical apparatus 12 and between the first angle selective film 1311 and the second angle selective film 1312 in the illumination system 1. Similarly, the second wavelength transformer 132 is disposed between the third angle selective film 1321 and the optical apparatus 12 and between the third angle selective film 1321 and the fourth angle selective film 1322. The transparent part 133 is disposed between the fifth angle selective film 1331 and the optical apparatus 12.

In the optical apparatus 12, the first lens 1211 and the second lens 1212 comprised in each of the sub-optical apparatuses 121 corresponding to the light source modules 11 respectively are sequentially disposed between the light source module 11 and the dichroic film 122; the third lens 123 and the fourth lens 124 of the optical apparatus 12 are sequentially disposed between the dichroic film 122 and the first wavelength transformer 131; and the dichroic film 122 is disposed on the third lens 123 on the side facing the second lenses 1212. With the positional relationships among the main components having been described, the connections among the components and efficacies thereof will be further elucidated hereinbelow.

Specifically, in this embodiment, the light source modules 11 using the blue LEDs are configured to generate a plurality of blue light beams 110. The light beams 110 are preliminarily focused by the sub-optical apparatuses 121 corresponding to the light source modules 11 respectively. Furthermore, as LEDs having a large divergence angle are used for the light source modules 11, the light beams 110 emitted by the light source modules 11 need to be firstly concentrated by the first lenses 1211 of the sub-optical apparatuses 121 before being further focused by the second lenses 1212.

Next, the dichroic film 122 allows a predetermined wave band light to pass therethrough. In this embodiment, the dichroic film 122 allows the light beams 110 generated by the light source modules 11 to pass therethrough. Upon passing through the dichroic film 122, the light beams 110 are focused to a predetermined position X by the third lens 123 and the fourth lens 124. In other words, one of the purposes of the optical apparatus 12 is to focus the light beams 110 to the predetermined position X.

It shall be particularly emphasized that as the blue LEDs are used for the light source modules 11 in the first embodiment, the dichroic film 122 used is adapted to allow light within the blue wave band to pass therethrough. In other implementations, the dichroic film may be varied depending on the light source modules used.

Then, the position of the wheel 13 is appropriately arranged. Through the rotation of the wheel 13, the first wavelength transformer 131, the second wavelength transformer 132 and the transparent part 133 disposed thereon are successively rotated to the predetermined position X where the light beams 110 are focused. Upon being focused to the predetermined position X, the light beams 110 naturally pass through the wheel 13. Because the wheel 13 is in a rotating state, the light beams 110 successively pass through the first wavelength transformer 131, the second wavelength transformer 132 and the transparent part 133 which are sequentially located at the predetermined position X. For convenience of the description, a case in which the light beams 110 pass through the first wavelength transformer 131 will be firstly explained hereinafter.

Firstly, when the wheel 13 rotates the first wavelength transformer 131 to the predetermined position X, the light beams 110 will be angle-selectively filtered by the second angle selective film 1312 before the light beams 110 travel into the first wavelength transformer 131. In detail, in the illumination system 1, the second angle selective film 1312 shall be designed to allow all the light beams 110 traveling to the second angle selective film 1312 to pass therethrough into the first wavelength transformer 131; and then the light beams 110 are transformed by the first wavelength transformer 131 into the first wave band light.

Additionally, because blue LEDs are used for the light sources in the first embodiment, the first wavelength transformer 131 may be made of a red phosphor or a green phosphor for transforming the blue light into a red wave band light or a green wave band light so as to obtain the three primary colors. However, this is not intended to limit the use of predetermined angles and the wavelength transformers in the present invention.

Next, after the light beams 110 are transformed into the first wave band light by the first wavelength transformer 131, the first wave band light may be divided into a first portion 1101a and a second portion 1102a by the first angle selective film 1311. The first portion 1101a of the first wave band light includes an angle smaller than the first predetermined angle $\theta 1$ with a main optical axis 14 of the illumination system 1, so it can pass through the first angle selective film 1311 and then travel into an imaging system of the projection apparatus along the same direction as the light beams 110. In contrast, the second portion 1102a of the first wave band light includes an angle greater than the first predetermined angle $\theta 1$ with the main optical axis 14, so it will be reflected by the first angle selective film 1311 towards the direction of the optical apparatus 12.

Similarly, the first angle selective film 1311 is used to angle-selectively filter the first wave band light according to the first predetermined angle $\theta 1$. It shall be particularly emphasized that the preferred value of the first predetermined angle $\theta 1$ is 30 degrees, although this is not intended to limit the value of the predetermined angle.

Furthermore, after the portion (including the second portion 1102a) of the first wave band light reflected by the first angle selective film 1311 back to the first wavelength transformer 131 passes through the first wavelength transformer 131, it is further divided into a third portion 1103a and a fourth portion 1104a by the second angle selective film 1312. In detail, the third portion 1103a of the first wave band light includes an angle smaller than a second predetermined angle $\theta 2$ with the main optical axis 14, so it will pass through the second angle selective film 1312 to travel along the direction towards the optical apparatus 12. Then, the third portion 1103a of the first wave band light will pass through the fourth lens 124 and the third lens 123 sequentially and be projected to the dichroic film 122.

In view of properties of the second angle selective film 1312, the optical apparatus 12 is specially designed in such a way that after the light beams 110, which are passing through the optical apparatus 12, are focused by the optical apparatus 12, an angle included between the light beams 110 and the main optical axis 14 is made as small as possible, compared to the second predetermined angle θ2, so that the light beams 110 all pass through the second angle selective film 1312 without reflection. In this way, the light beams 110 emitted by the light source modules 11 can be fully used. It shall be particularly emphasized that the preferred value of the second predetermined angle θ2 is 60 degrees.

In detail, the dichroic film 122 is disposed on the third lens 123 and is specially designed to be formed as the curved surface that follows the shape of the third lens 123. The curved surface has a radius of curvature. When the third portion 1103a of the first wave band light is projected to the dichroic film 122 via the fourth lens 124 and the third lens 123 sequentially, it will orthogonally impinge on the dichroic film 122 as if being emitted from a point light source at the imaging position Y. Therefore, the distance from the imaging position Y to the dichroic film 122 is substantially equal to the radius of curvature of the dichroic film 122.

Furthermore, the dichroic film 122 can reflect this portion of the first wave band light back towards the direction of the wheel 13 again. In this case, the third portion 1103a of the first wave band light can be reflected perpendicular to the dichroic film 122 to travel towards the wheel 13 again and then pass through the second angle selective film 1312 for use. Thereby, recycling of the light is accomplished to increase the utilization ratio of the light source.

The fourth portion 1104a of the first wave band light includes an angle greater than the second predetermined angle θ2 with the main optical axis 14, so it will be reflected by the second angle selective film 1312 to pass through the first wavelength transformer 131 and to be angle-selectively filtered by the first angle selective film 1311 again. With such an arrangement, the light can be concentrated effectively.

According to the above disclosures, it can be understood that the angle selective films function to angle-selectively filter the light beams to recycle and concentrate the light through the angle selection. By using the first angle selective film 1311 to restrict the angles of the first portion 1101a of the light beams passing therethrough, the etendue is significantly reduced. Thereby, the limitation imposed by the law of conservation of etendue in an optical system and the technical problem that the projection apparatus cannot make full use of the light beams emitted by the LEDs to form an image due to the large etendue of the large light divergence angle of the LEDs are overcome. It shall be particularly emphasized that to achieve a desirable effect of recycling and concentrating the light, the first predetermined angle θ1 is usually set to be substantially smaller than the second predetermined angle θ2.

Similarly, according to the aforesaid optical principles, when the second wavelength transformer 132 on the wheel 13 is rotated to the predetermined position X, the light beams 110 projected to the second wavelength transformer 132 will experience a similar process. In reference to FIG. 1B, when the wheel 13 rotates the second wavelength transformer 132 to the predetermined position X, the light beams 110 will be angle-selectively filtered by the fourth angle selective film 1322 before the light beams 110 travel into the second wavelength transformer 132. In detail, the fourth angle selective film 1322 shall be designed to allow all the light beams 110 traveling to the fourth angle selective film 1322 through the optical apparatus 12 to pass therethrough into the second wavelength transformer 132; and then the light beams 110 are transformed by the second wavelength transformer 132 into a second wave band light.

Figure 1B:
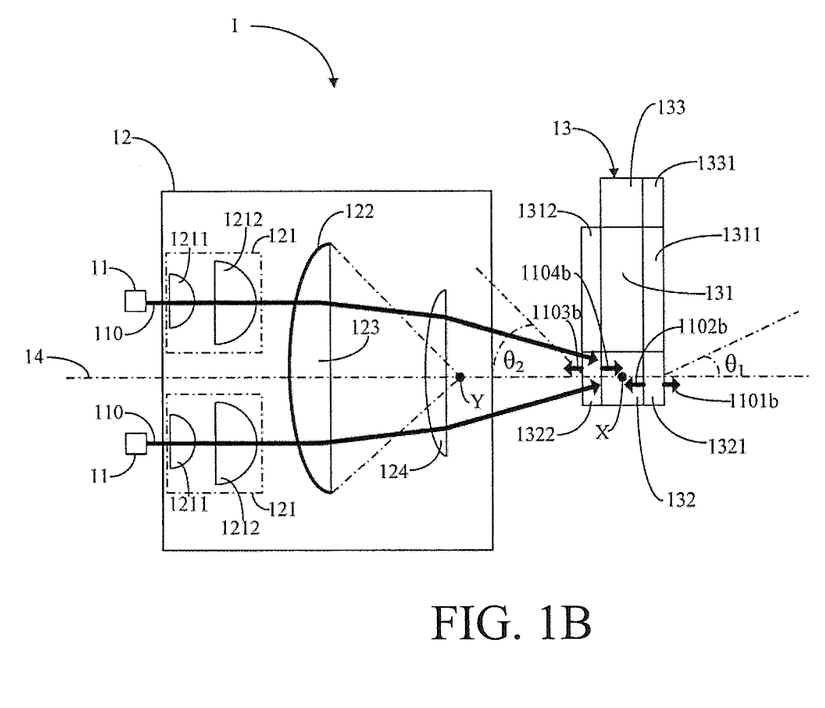

To obtain light beams of the three primary colors, the second wavelength transformer 132 may be made of a green phosphor or a red phosphor, but is different from the first wavelength transformer 131. For example, if the first wavelength transformer 131 is a red phosphor, then the second wavelength transformer 132 is a green phosphor. In this way, the blue light can be transformed into a red wave band light and a green wave band light.

After the light beams 110 are transformed into the second wave band light, the second wave band light may be divided into a first portion 1101b and a second portion 1102b by the third angle selective film 1321. The first portion 1101b of the second wave band light includes an angle smaller than the first predetermined angle θ1 with the main optical axis 14, so it can pass through the third angle selective film 1321 and then travel along the same direction as the light beams 110 for subsequent use in the projection apparatus. In contrast, the second portion 1102b of the second wave band light includes an angle greater than the first predetermined angle θ1 with the main optical axis 14, so it will be reflected by the third angle selective film 1321 towards the direction of the optical apparatus 12 and then impinge on the fourth angle selective film 1322. That is, the third angle selective film 1321 filters the second wave band light according to the first predetermined angle θ1.

The second wave band light may further be divided into a third portion 1103b and a fourth portion 1104b by the fourth angle selective film 1322. In detail, the third portion 1103b of the second wave band light includes an angle smaller than the second predetermined angle θ2 with the main optical axis 14, so it will pass through the fourth angle selective film 1322 to travel along a direction towards the optical apparatus 12. Similarly, the third portion 1103b of the second wave band light will pass through the fourth lens 124 and the third lens 123 sequentially and be projected to the dichroic film 122. In this case, the dichroic film 122 can reflect this portion of the second wave band light back towards the direction of the wheel 13 again. Thus, recycling of the light can be accomplished by means of the dichroic film 122 of the optical apparatus 12 to increase the utilization ratio of the light source.

Additionally, the fourth portion 1104b of the second wave band light includes an angle greater than the second predetermined angle θ2 with the main light axis 14, so it will be reflected by the fourth angle selective film 1322 to pass through the second wavelength transformer 132 again and to impinge on the third angle selective film 1321. Thus, with the aforesaid arrangement, the illumination system 1 can project the red light and the green light that are more concentrated and have enhanced intensity.

Figure 1C:
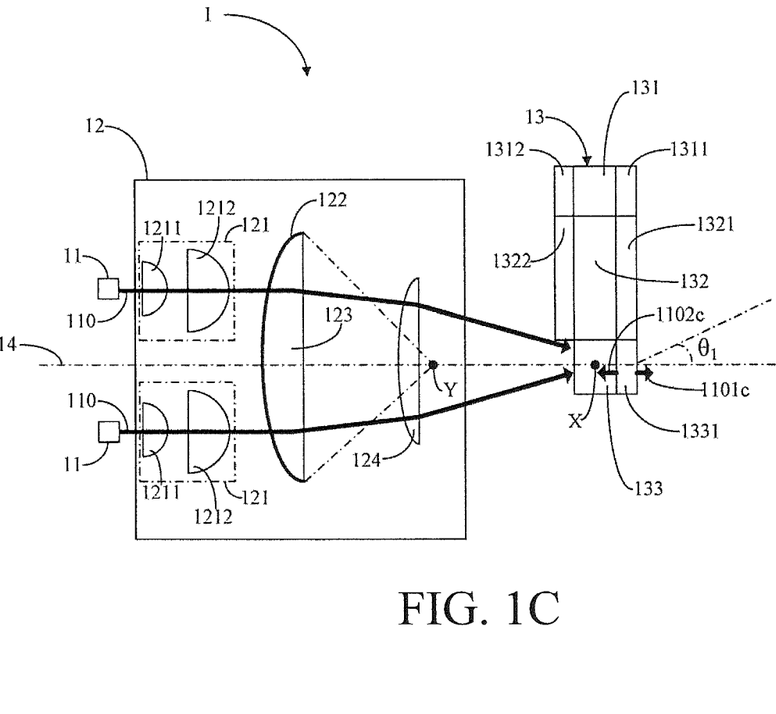

Finally, in reference to FIG. 1C, when the transparent part 133 on the wheel 13 is rotated to the predetermined position X, the light beams 110 will pass through the transparent part 132 as a third wave band light. In this embodiment, the third wave band light is made of the blue light beams 110 emitted by the light source modules 11 and passes through the dichroic film 122.

Specifically, after the third wave band light travels into the transparent part 133, it is divided by the fifth angle selective film 1331 into a first portion 1101c and a second portion 1102c. The first portion 1101c of the third wave band light includes an angle smaller than the first predetermined angle θ1 with the main optical axis 14, so it can pass through the fifth angle selective film 1331. The second portion 1102c of the third wave band light includes an angle greater than the first predetermined angle θ1 with the main optical axis 14, so it will be reflected by the fifth angle selective film 1331. Similarly, the fifth angle selective film 1331 filters the third wave band light according to the first predetermined angle θ1.

According to the above descriptions, the blue light emitted by the blue LEDs can be projected as the red light, the green light and the blue light respectively after passing through the first wavelength transformer 131, the second wavelength transformer 132 and the transparent part 133; and the etendue of the light beams 110 are significantly reduced so that they can be effectively concentrated and recycled. Because the blue LEDs are directly used as the light source in the first embodiment, the light beams emitted by the blue LEDs can be directly used as the blue light in the three primary colors. In the following second embodiment, how to use common ultraviolet (UV) LEDs as the light sources of the present invention will be described.

Figure 2:
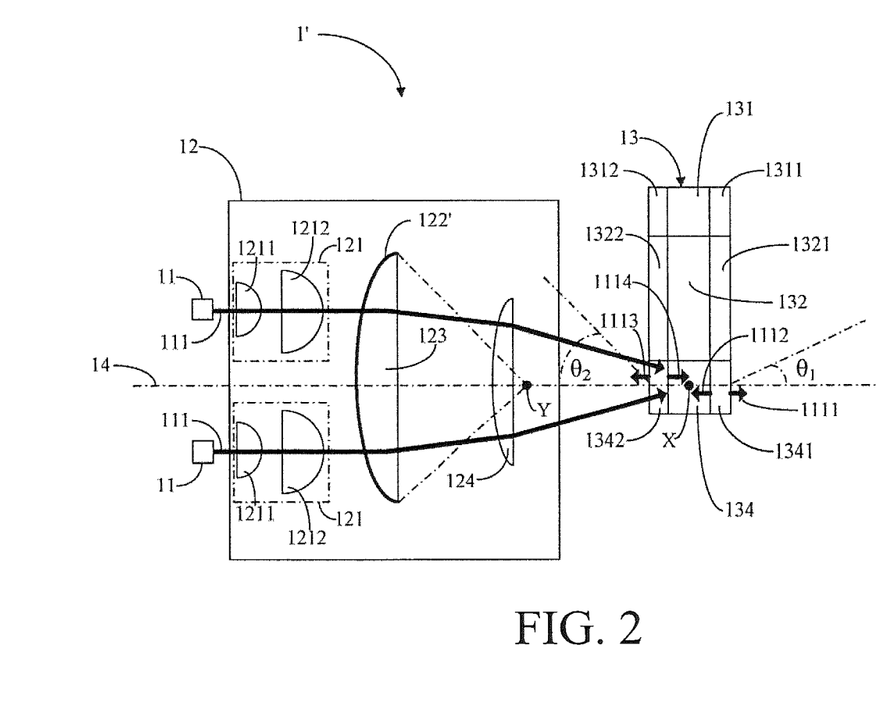
FIG. 2 is a schematic view of a second embodiment of the present invention.

FIG. 2 illustrates a schematic view of an illumination system 1' according to the second embodiment of the present invention. It shall be particularly appreciated that the components that are the same as those of the first embodiment all have roughly the same arrangement and functions as those of the first embodiment, and thus will not be further described herein; and for purposes of simplicity and clarity, emphasis will be placed only on differences between the first embodiment and the second embodiment hereinafter.

In detail, the differences lie in that in the second embodiment, the two light source modules 11 employ UV LEDs to emit UV light beams 111 instead; the dichroic film of the first embodiment is replaced with a dichroic film 122' that allows UV light to pass therethrough; and the transparent part 133 of the first embodiment is replaced with a third wavelength transformer 134. The fifth angle selective film 1341 and sixth angle selective film 1342 are disposed on the third wavelength transformer 134. Additionally, because a red phosphor and a green phosphor have been employed as the first wavelength transformer 131 and the second wavelength transformer 132 to excite the red light and the green light respectively, a blue phosphor may be selected as the third wavelength transformer 134 to excite the blue light. However, this is not intended to limit the materials of the wavelength transformers.

Specifically, the third wavelength transformer 134 of the illumination system 1' is also disposed on the wheel 13. The functions and effects of the third wavelength transformer 134 are the same as those of the first wavelength transformer 131 and the second wavelength transformer 132 except that the wavelengths to be transformed are different. When the wheel 13 rotates the third wavelength transformer 134 to the predetermined position X but before the light beams 111 travel into the third wavelength transformer 134, the angles of the light beams 111 will be selectively filtered by the sixth angle selective film 1342. In detail, the sixth angle selective film 1342 shall be designed to allow all the light beams 111 traveling to the sixth angle selective film 1342 through the optical apparatus 12 to pass therethrough into the third wavelength transformer 134; and then the light beams 111 are transformed by the third wavelength transformer 134 into a third wave band light. In this embodiment, the third wave band light is the blue light.

Next, after the light beams 111 are transformed into the third wave band light, the third wave band light may be divided into a first portion 1111 and a second portion 1112 by the fifth angle selective film 1341. The first portion 1111 of the third wave band light includes an angle smaller than the first predetermined angle $\theta 1$ with the main optical axis 14 so it can pass through the fifth angle selective film 1341. In contrast, the second portion 1112 of the third wave band light includes an angle greater than the first predetermined angle $\theta 1$ with the optical light axis 14, so it will be reflected by the fifth angle selective film 1341 and pass through the third wavelength transformer 134 to impinge on the sixth angle selective film 1342.

Then, the third wave band light may further be divided into a third portion 1113 and a fourth portion 1114 by the sixth angle selective film 1342. In detail, the third portion 1113 of the third wave band light includes an angle smaller than the second predetermined angle $\theta 2$ with the main optical axis 14, so it will pass through the sixth angle selective film 1342 to travel along a direction towards the optical apparatus 12. The third portion 1113 of the third wave band light will pass through the fourth lens 124 and the third lens 123 sequentially and be projected to the dichroic film 122'. In this embodiment, unlike the dichroic film 122 of the first embodiment that allows the third wave band light (the blue light) to pass therethrough, the dichroic film 122' is designed to reflect the third wave band light (the blue light) back towards the direction of the wheel 13 again.

Similar to that of the first embodiment, the dichroic film 122' is specially designed in such a way that the distance from an imaging position Y to the dichroic film 122' is substantially equal to the radius of curvature of the dichroic film 122'; and here, when the third portion 1113 of the third wave band light is projected to the dichroic film 122' via the fourth lens 124 and the third lens 123 sequentially, it orthogonally impinges on the dichroic film 122' as if being emitted from a point light source at the imaging position Y, and is reflected by the dichroic film 122' without angular deviation. In this way, recycling of the light can be accomplished by means of the dichroic film 122' of the optical apparatus 12 to increase the utilization ratio of the light source.

Additionally, the fourth portion 1114 of the third wave band light includes an angle greater than the second predetermined angle $\theta 2$ with the main optical axis 14, so it will be reflected by the sixth angle selective film 1342. Thus, with the arrangement of the illumination system 1' of the second embodiment, non-trichromatic light sources such as UV LEDs may also be used to generate the three primary colors.

Figure 3:
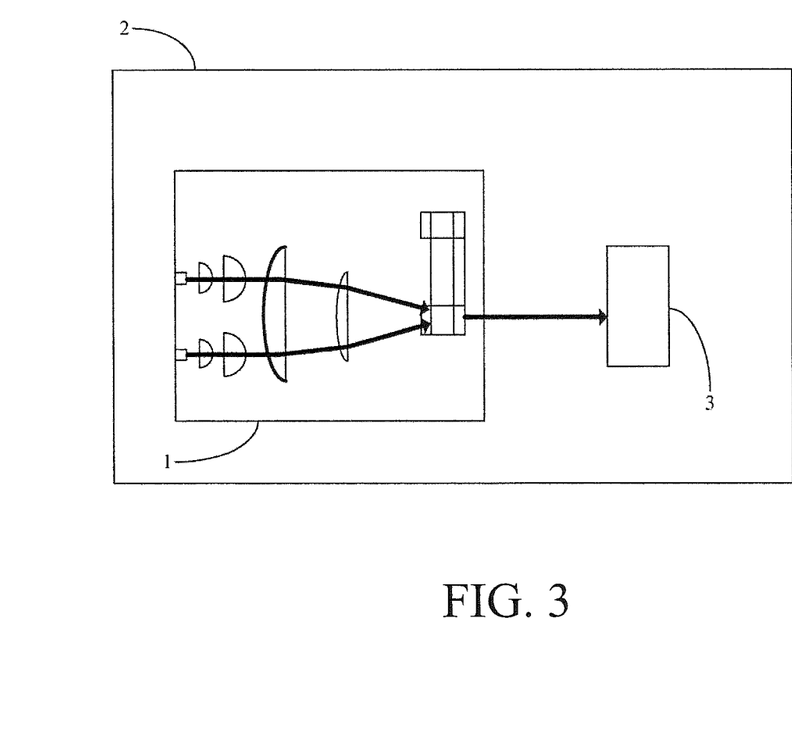
FIG. 3 is a schematic view of a projection apparatus of the present invention.

It shall be particularly appreciated that the implementations of both types of illumination systems described above can be applied to any projection apparatus. In reference to FIG. 3, taking the illumination system 1 of the first embodiment as an example, the illumination system 1 can be applied to a projection apparatus 2, which further comprises an imaging system 3 such as a digital micromirror device (DMD). The illumination system 1 is configured to output light of the three primary colors to the imaging system 3 of the projection apparatus 2; the imaging system 3 is configured to receive and process the output light to form an image on a screen. Similarly, the illumination system 1' of the second embodiment of the present invention and various possible implementations thereof can also be applied to the projection apparatus 2 to output a light.

According to the above descriptions, with the arrangement of the angle selective films, the phosphors, the light source modules and the optical apparatus, the illumination system of the present invention can reduce the etendue, enhance the luminance and promote recycling of the light to effectively increase the maximum utilization ratio of the light source. Thereby, a better light source is obtained in the projection apparatus to which the illumination system applies, and the imaging quality is further improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system comprising:
   a plurality of light source modules for generating a plurality of light beams;
   a first wavelength transformer disposed in a predetermined position, and configured to transform the light beams into a first wave band light which comprises at least a first portion, a second portion, a third portion and a fourth portion;
   an optical apparatus disposed between the light source modules and the first wavelength transformer, and configured to focus the light beams to the predetermined position;
   a first angle selective film disposed on the first wavelength transformer; and
   a second angle selective film which is disposed on the first wavelength transformer;
   wherein the first wavelength transformer is disposed between the first angle selective film and the optical apparatus, and disposed between the first angle selective film and the second angle selective film;
   wherein the illumination system further has a main optical axis, an included angle of the first portion of the first wave band light and the main optical axis is smaller than a first predetermined angle so that the first portion of the first wave band light is capable of passing through the first angle selective film, an included angle of the second portion of the first wave band light and the main optical axis is greater than the first predetermined angle so that the second portion of the first wave band light is reflected from the first angle selective film, an included angle of the third portion of the first wave band light and the main optical axis is smaller than a second predetermined angle so that the third portion of the first wave band light is capable of passing through the second angle selective film, and an included angle of the fourth portion of the first wave band light and the main optical axis is greater than the second predetermined angle so that the fourth portion of the first wave band light is reflected from the second angle selective film.

2. The illumination system as claimed in claim 1, wherein the optical apparatus comprises a plurality of sub-optical apparatuses corresponding to the light source modules respectively, and each of the sub-optical apparatuses is configured to focus the light beam generated by the corresponding light source module respectively.

3. The illumination system as claimed in claim 2, wherein the optical apparatus further comprises a dichroic film which is capable of passing a predetermined wave band light therethrough, and the dichroic film is configured to filter the light beams generated by the light source modules and to reflect the first wave band light.

4. The illumination system as claimed in claim 3, wherein the dichroic film is formed as a curved surface having a radius of curvature, an imaging position is formed from the predetermined position and focused by a portion of the optical apparatus, and the radius of curvature of the curved surface is substantially equal to a distance from the imaging position to the dichroic film.

5. The illumination system as claimed in claim 4, wherein each of the sub-optical apparatuses corresponding to the light source modules comprises a first lens and a second lens, and the first lens and the second lens are disposed between the corresponding light source module and the dichroic film in order to focus the light beams.

6. The illumination system as claimed in claim 5, wherein the optical apparatus further comprises a third lens and a fourth lens, the third lens and the fourth lens are disposed between the dichroic film and the first wavelength transformer in order to focus the light beams to the predetermined position, and the dichroic film is deposited on the third lens and disposed between the second lenses and the third lens.

7. The illumination system as claimed in claim 6, wherein the second lenses and the fourth lens are aspheric lenses and are made of plastic, and the first lenses and the third lens are made of glass.

8. The illumination system as claimed in claim 1, wherein the first wavelength transformer is selected from a group of a red phosphor and a green phosphor.

9. The illumination system as claimed in claim 3, further comprising a wheel, wherein the first wavelength transformer is disposed on the wheel, and the wheel is configured to rotate the first wavelength transformer to the predetermined position.

10. The illumination system as claimed in claim 9, further comprising:
    a second wavelength transformer disposed on the wheel and configured to transform the light beams into a second wave band light, wherein the dichroic film is capable of reflecting the second wave band light, the wheel is configured to rotate the first wavelength transformer and the second wavelength transformer to the predetermined position in turn, and the optical apparatus is disposed between the plurality of light source modules and the second wavelength transformer for focusing the light beams to the first wavelength transformer and the second wavelength transformer at the predetermined position in turn; and
    a third angle selective film disposed on the second wavelength transformer;
    wherein the second wavelength transformer is disposed between the third angle selective film and the optical apparatus, the second wave band light comprises at least a first portion and a second portion, an included angle of the first portion of the second wave band light and the main optical axis is smaller than the first predetermined angle so that the first portion of the second wave band light is capable of passing through the third angle selective film, and an included angle of the second portion of the second wave band light and the main optical axis is greater than the first predetermined angle so that the second portion of the second wave band light is reflected by the third angle selective film.

11. The illumination system as claimed in claim 10, further comprising a fourth angle selective film which is disposed on the second wavelength transformer, wherein the second wavelength transformer is disposed between the third angle selective film and the fourth angle selective film, the second wave band light comprises at least a third portion and a fourth portion, an included angle of the third portion of the second wave band light and the main optical axis is smaller than a second predetermined angle so that the third portion of the second wave band light is capable of passing through the fourth angle selective film, and an included angle of the fourth portion of the second wave band light and the main optical axis is greater than the second predetermined angle so that the fourth portion of the second wave band light is reflected by the fourth angle selective film.

12. The illumination system as claimed in claim 10, wherein the second wavelength transformer is selected from a group of a red phosphor and a green phosphor, and the second wavelength transformer is different from the first wavelength transformer.

13. The illumination system as claimed in claim 9, further comprising:
   a transparent part disposed on the wheel, wherein the light beams as a third wave band light pass through the transparent part, the wheel is configured to rotate the first wavelength transformer and the transparent part to the predetermined position in turn, and the optical apparatus is disposed between the plurality of light source modules and the transparent part for focusing the light beams to the first wavelength transformer and the transparent part at the predetermined position in turn; and
   a fifth angle selective film disposed on the transparent part, wherein the transparent part is disposed between the fifth angle selective film and the optical apparatus, the third wave band light comprises at least a first portion and a second portion, an included angle of the first portion of the third wave band light and the main optical axis is smaller than the first predetermined angle so that the first portion of the third wave band light is capable of passing through the fifth angle selective film, and an included angle of the second portion of the third wave band light and the main optical axis is greater than the first predetermined angle so that the second portion of the third wave band light is reflected by the fifth angle selective film.

14. The illumination system as claimed in claim 13, wherein the plurality of the light source modules are blue light emitting diodes (LEDs).

15. The illumination system as claimed in claim 10, further comprising:
   a third wavelength transformer disposed on the wheel and configured to transform the light beams into a third wave band light, wherein the dichroic film is further capable of reflecting the third wave band light, the wheel is configured to rotate the first wavelength transformer and the third wavelength transformer to the predetermined position in turn, and the optical apparatus is disposed between the plurality of light source modules and the third wavelength transformer for focusing the light beams to the first wavelength transformer and the third wavelength transformer at the predetermined position in turn; and
   a fifth angle selective film disposed on the third wavelength transformer, wherein the third wavelength transformer is disposed between the fifth angle selective film and the optical apparatus, the third wave band light comprises at least a first portion and a second portion, an included angle of the first portion of the third wave band light and the main optical axis is smaller than the first predetermined angle so that the first portion of the third wave band light is capable of passing through the fifth angle selective film, and an included angle of the second portion of the third wave band light and the main optical axis is greater than the first predetermined angle so that the second portion of the third wave band light is reflected by the fifth angle selective film.

16. The illumination system as claimed in claim 15, further comprising a sixth angle selective film which is disposed on the third wavelength transformer, wherein the third wavelength transformer is disposed between the fifth angle selective film and the sixth angle selective film, the third wave band light comprises a third portion and a fourth portion at least, an included angle of the third portion of the third wave band light and the main optical axis is smaller than a second predetermined angle so that the third portion of the third wave band light is capable of passing through the sixth angle selective film, and an included angle of the fourth portion of the third wave band light and the main light axis is greater than the second predetermined angle so that the fourth portion of the third wave band light is reflected by the sixth angle selective film.

17. The illumination system as claimed in claim 15, wherein the plurality of light source modules are ultraviolet light emitting diodes (UV LEDs).

18. The illumination system as claimed in claim 15, wherein the third wavelength transformer is a blue phosphor.

19. The illumination system as claimed in claim 1, wherein the first predetermined angle is smaller than the second predetermined angle.

20. The illumination system as claimed in claim 11, wherein the first predetermined angle is smaller than the second predetermined angle.

21. The illumination system as claimed in claim 16, wherein the first predetermined angle is smaller than the second predetermined angle.

22. The illumination system as claimed in claim 1, wherein the first predetermined angle is substantially equal to 30 degrees.

23. The illumination system as claimed in claim 1, wherein the second predetermined angle is substantially equal to 60 degrees.

24. A projection apparatus, comprising:
   an illumination system of claim 1 configured to output a light; and
   an imaging system configured to receive and process the light to form an image.

* * * * *